(12) United States Patent
Cho et al.

(10) Patent No.: US 12,081,692 B2
(45) Date of Patent: *Sep. 3, 2024

(54) WATCH PHONE AND METHOD FOR HANDLING AN INCOMING CALL IN THE WATCH PHONE

(71) Applicant: SAMSUNG ELECTRONICS CO., LTD., Suwon-si (KR)

(72) Inventors: Shi-Yun Cho, Seoul (KR); Ji-Hyun Jung, Seongnam-si (KR); Ho-Jin Lee, Suwon-si (KR); Young-Min Lee, Yongin-si (KR); Ho-Seong Seo, Suwon-si (KR); Youn-Ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,355

(22) Filed: Nov. 3, 2022

(65) Prior Publication Data

US 2023/0046450 A1     Feb. 16, 2023

Related U.S. Application Data

(63) Continuation of application No. 15/811,570, filed on Nov. 13, 2017, now Pat. No. 11,516,332, which is a
(Continued)

(30) Foreign Application Priority Data

Dec. 4, 2008    (KR) .......................... 10-2008-0122488

(51) Int. Cl.
*H04M 1/724*    (2021.01)
*G06F 1/16*    (2006.01)
(Continued)

(52) U.S. Cl.
CPC ............ *H04M 1/724* (2021.01); *G06F 1/163* (2013.01); *G06F 3/0488* (2013.01); *H04B 1/385* (2013.01); *H04M 2250/22* (2013.01)

(58) Field of Classification Search
CPC ............. H04M 1/724; H04M 2250/22; H04M 1/72403; G06F 1/163; G06F 3/0488;
(Continued)

(56) References Cited

U.S. PATENT DOCUMENTS 4,120,036 A * 10/1978 Maeda ................... G04G 9/007
                                                           368/29
5,477,508 A    12/1995 Will
(Continued)

FOREIGN PATENT DOCUMENTS

DE          195 28 734           2/1997
DE         102008029847         12/2009
(Continued)

OTHER PUBLICATIONS

Office Action dated Aug. 11, 2017 in parent U.S. Appl. No. 12/631,298, filed Dec. 4, 2009.
(Continued)

*Primary Examiner* — Kc Chen
*Assistant Examiner* — Kuang F Chen
(74) *Attorney, Agent, or Firm* — Nixon & Vanderhye, P.C.

(57) ABSTRACT

A watch phone and a method for handling an incoming call using the watch phone are provided. In the watch phone, a display device includes a touch screen panel and a display, turns off the touch screen panel in a watch mode, turns on the touch screen panel in an idle mode or upon receipt of an incoming call, and displays at least two areas for call connection and call rejection, upon receipt of the incoming call. A single mode selection key selects one of the watch
(Continued)

mode and the idle mode. A controller performs control operations so that the touch screen panel is turned off in the watch mode and is turned on in the idle mode or upon receipt of the incoming call, and connects or rejects the incoming call, when the at least two areas for call connection or call rejection, which are displayed upon receipt of the incoming call, are pointed to or dragged to.

7 Claims, 5 Drawing Sheets

Related U.S. Application Data continuation of application No. 12/631,298, filed on Dec. 4, 2009, now abandoned.

(51) Int. Cl.
*G06F 3/0488* (2022.01)
*H04B 1/3827* (2015.01)

(58) Field of Classification Search
CPC ...... G06F 1/1626; G06F 1/1643; G06F 3/041; G06F 3/14; H04B 1/385
See application file for complete search history.

(56) References Cited

U.S. PATENT DOCUMENTS

| | | | |
|---|---|---|---|
| 5,552,779 | A | 9/1996 | Gaskill et al. |
| 5,758,295 | A | 5/1998 | Ahlberg et al. |
| 5,892,455 | A | 4/1999 | Matsumoto |
| 6,377,685 | B1 | 4/2002 | Krishnan |
| 6,720,860 | B1 | 4/2004 | Narayanaswami |
| 6,785,560 | B1 | 8/2004 | Chow et al. |
| 7,254,219 | B1 | 8/2007 | Hansen |
| 8,145,196 | B2 | 3/2012 | Wood et al. |
| 8,321,811 | B2 * | 11/2012 | Koo ................... G06F 3/0488 715/837 |
| 9,152,309 | B1 | 10/2015 | Arrehn |
| 2002/0034293 | A1 | 3/2002 | Horowitz |
| 2002/0191029 | A1 | 12/2002 | Gillespie |
| 2003/0023353 | A1 | 1/2003 | Badarneh |
| 2003/0123626 | A1 | 7/2003 | Beckmann et al. |
| 2004/0266426 | A1 | 12/2004 | Marsh |
| 2005/0043063 | A1 | 2/2005 | Dinn |
| 2005/0079896 | A1 | 4/2005 | Kokko et al. |
| 2005/0198589 | A1 | 9/2005 | Heikes et al. |
| 2005/0253817 | A1 | 11/2005 | Rytivaara et al. |
| 2006/0010200 | A1 | 1/2006 | Mousseau et al. |
| 2006/0158439 | A1 | 7/2006 | Luo et al. |
| 2006/0189345 | A1 | 8/2006 | Suzuki et al. |
| 2006/0263068 | A1 | 11/2006 | Jung |
| 2007/0035513 | A1 | 2/2007 | Sherrard et al. |
| 2007/0087789 | A1 | 4/2007 | Lee |
| 2007/0136686 | A1 | 6/2007 | Price et al. |
| 2007/0150842 | A1 | 6/2007 | Chaudhri et al. |
| 2007/0168426 | A1 | 7/2007 | Ludwig et al. |
| 2007/0174515 | A1 | 7/2007 | Sinclair |
| 2007/0201644 | A1 | 8/2007 | Metcalf |
| 2007/0239833 | A1 | 10/2007 | Alperin et al. |
| 2008/0059880 | A1 * | 3/2008 | Cato ................... B62B 3/1408 715/700 |
| 2008/0070648 | A1 | 3/2008 | Kang et al. |
| 2008/0122796 | A1 | 5/2008 | Jobs et al. |
| 2008/0168361 | A1 | 7/2008 | Forstall |
| 2008/0168395 | A1 | 7/2008 | Ording |
| 2008/0174570 | A1 | 7/2008 | Jobs |
| 2008/0183313 | A1 | 7/2008 | Lundquist |
| 2008/0188272 | A1 | 8/2008 | Ohmoto |
| 2009/0061837 | A1 | 3/2009 | Chaudhri et al. |
| 2009/0069045 | A1 | 3/2009 | Cheng |
| 2009/0083850 | A1 | 3/2009 | Fadell et al. |
| 2009/0089683 | A1 | 4/2009 | Thapa |
| 2009/0117945 | A1 | 5/2009 | Mahler |
| 2009/0137284 | A1 | 5/2009 | Liyanaarachchi |
| 2009/0146848 | A1 | 6/2009 | Ghassabian |
| 2009/0177981 | A1 | 7/2009 | Christie |
| 2009/0199130 | A1 | 8/2009 | Tsern |
| 2009/0219252 | A1 | 9/2009 | Jarventie et al. |
| 2009/0248913 | A1 | 10/2009 | Salokannel |
| 2009/0249252 | A1 | 10/2009 | Lundy et al. |
| 2009/0264156 | A1 | 10/2009 | Burghardt |
| 2009/0278806 | A1 | 11/2009 | Duarte |
| 2009/0280861 | A1 * | 11/2009 | Khan ................... H04B 1/3827 455/556.1 |
| 2009/0285383 | A1 | 11/2009 | Tsuei |
| 2009/0296951 | A1 | 12/2009 | De Haan |
| 2009/0298546 | A1 | 12/2009 | Kim et al. |
| 2010/0001967 | A1 | 1/2010 | Yoo |
| 2010/0009749 | A1 | 1/2010 | Chrzanowski, Jr. |
| 2010/0029327 | A1 * | 2/2010 | Jee ................... G06F 1/163 345/173 |
| 2010/0081385 | A1 | 4/2010 | Lin et al. |
| 2010/0081486 | A1 | 4/2010 | Kim |
| 2011/0025632 | A1 | 2/2011 | Lee |

FOREIGN PATENT DOCUMENTS

| | | |
|---|---|---|
| EP | 1 860 539 | 11/2007 |
| EP | 1 956 601 | 8/2008 |
| JP | 08-047025 | 2/1996 |
| KR | 20-0193130 | 8/2000 |
| KR | 100823871 | 4/2008 |
| WO | 2004/001560 | 12/2003 |

OTHER PUBLICATIONS

Extended Search Report dated Jun. 29, 2018 in counterpart European Patent Application No. 18165482.3.
David Pogue, "iPhone, The Missing Manual, 2nd edition", Aug. 2008 , O'Reilly Media, Inc., pp. 1-4.
David Pogue, "iPHone: the Missing Manual, 2nd Edition", Aug. 13, 2008, O'Reilly Media, Inc., pp. 1-19.
Cho, U.S. Appl. No. 12/631,298, filed Dec. 4, 2009, Abandoned.
Cho, U.S. Appl. No. 15/811,570, filed Nov. 13, 2017, Allowed.
iPhone User Guide for iPhone and iPhone 3G, 2008 (154 pages).
Watch Phone M800 videoreview da telefonino.net (youtube.com), https://www.youtube.com/watch?v=O2illFbC2X8, Dec. 26, 2007.

\* cited by examiner

WATCH PHONE AND METHOD FOR HANDLING AN INCOMING CALL IN THE WATCH PHONE

CROSS-REFERENCE TO RELATED APPLICATIONS

This application is a continuation of U.S. application Ser. No. 15/811,570, filed on Nov. 13, 2017, now U.S. Pat. No. 11,516,332, which is a continuation of U.S. application Ser. No. 12/631,298, filed on Dec. 4, 2009, now abandoned, which is based on and claims priority under 35 U.S. § 119 to Korean Patent Application No. 10-2008-0122488, filed on Dec. 4, 2008, in the Korean Intellectual Property Office. The contents of each of these applications are incorporated by reference herein in their entirety.

BACKGROUND

1. Field

The present invention generally relates to a watch phone and a method for performing a call using the watch phone. More particularly, the present invention relates to a watch phone including a touch screen panel and a single key, for easily performing a call and a method for performing a call using the watch phone.

2. Description of Related Art

The demand for portable terminals with touch screen panels is continually increasing. For example, FIG. 1 illustrates a conventional portable terminal with a touch screen panel.

Figure 1:
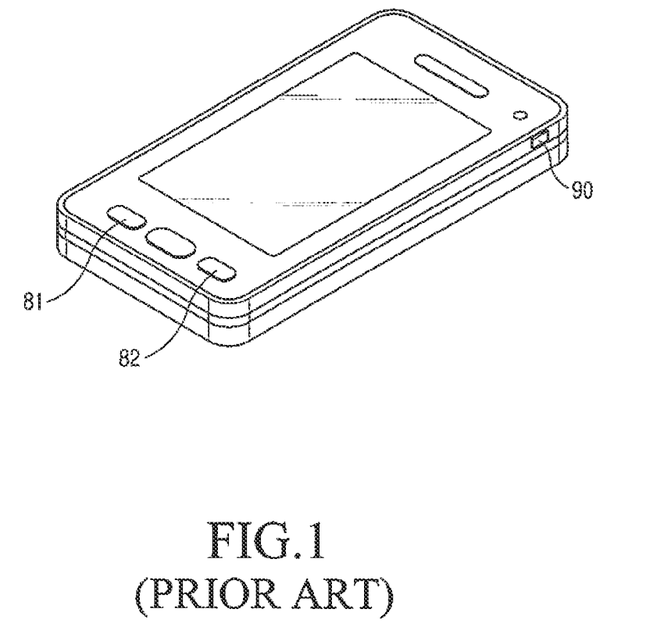
FIG. 1 illustrates a conventional portable terminal with a touch screen panel.

Referring to FIG. 1, when the portable terminal is in an idle mode, an unintended input may still be received by the touch screen panel, for example, while the portable terminal is being carried in a pocket or purse, or due to an inadvertent touching. To prevent inadvertent operations, the portable terminal further includes a touch screen locking key 90, so that the touch screen panel is kept off during the idle mode and cannot receive any inadvertent inputs.

Further, upon receipt of an incoming call in the idle mode with the touch screen panel kept off, automatic activation of the touch screen panel may still cause a wrong operation. Therefore, the touch screen panel is typically kept in the off state despite the incoming call, until intentionally activated by the user through the locking key 90.

Further, when a call is received after unlocking the touch screen, to accept or reject the incoming call, a call key 81 or an end key 82 is also provided on the portable terminal.

Accordingly, the conventional portable terminal with a touch screen panel needs at least three keys for standard operations. Further, as three or more keys are required to use the touch screen panel, the touch screen panel is not very feasible for a small-size design-oriented structure such as a watch phone.

SUMMARY

Therefore, the embodiments of the present invention are designed to address at least the problems and/or disadvantages described above and to provide at least the advantages as will be described below. Accordingly, an aspect of the present invention is to provide a watch phone including a touch screen panel and a single key, for easily performing a call, and a method for performing a call using the watch phone.

In accordance with an aspect of the present invention, there is provided a watch phone including a touch screen panel and a display, wherein the watch phone turns off the touch screen panel in a watch mode, turns on the touch screen panel in an idle mode or upon receipt of an incoming call, and displays at least two areas for call connection or call rejection upon receipt of the incoming call. A single mode selection key selects one of the watch mode and the idle mode, and a controller performs control operations such that the touch screen panel is turned off in the watch mode and turned on in the idle mode or upon receipt of the incoming call, and such that the incoming call is connected or rejected when the at least two areas for call connection or call rejection, displayed upon receipt of the incoming call, are pointed to or dragged.

In accordance with another aspect of the present invention, there is provided a method for performing a call in a watch phone, in which a touch screen panel is turned off in watch mode and turned on in idle mode, according to a mode selection, at least two areas for call connection or call rejection are displayed. In the method, upon receipt of an incoming call in the watch mode or in the idle mode, the incoming call is connected, when the at least two areas for call connection are pointed to or dragged, and the incoming call is rejected, when the at least two areas for call rejection are pointed to or dragged.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description such as a detailed construction and elements are provided to assist in a comprehensive understanding of certain embodiments of the present invention. Accordingly, those of ordinary skill in the art will recognize that various changes and modifications of the embodiments described herein can be made without departing from the scope and spirit of the present invention.

Also, descriptions of well-known functions and constructions are omitted for clarity and conciseness.

Figure 2:
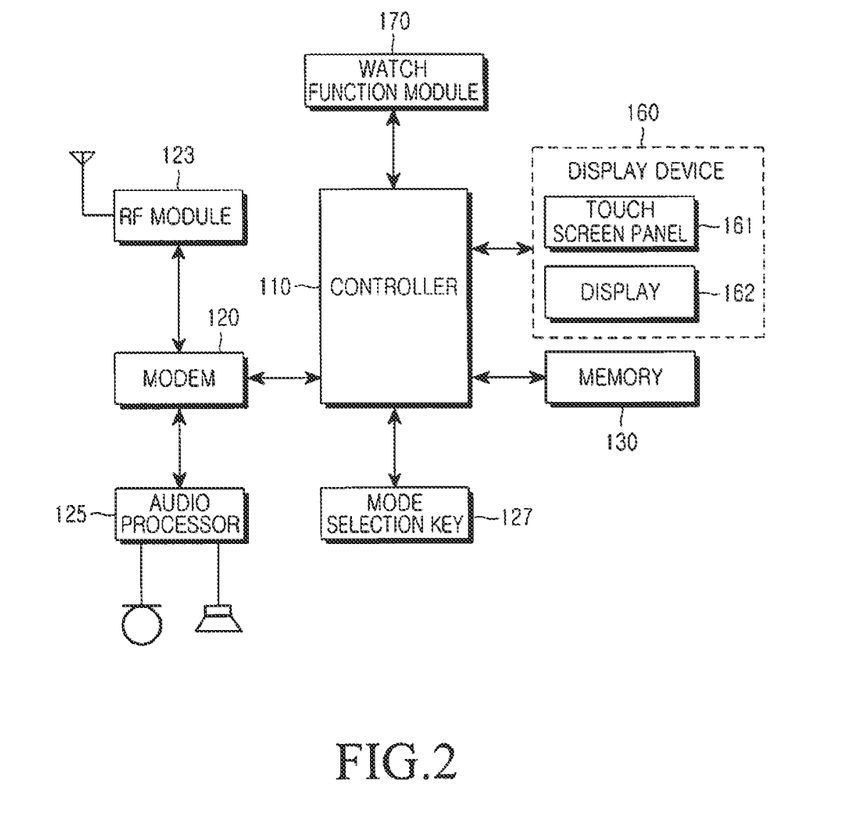
FIG. 2 is a block diagram of a watch phone including a touch screen panel according to an embodiment of the present invention.
Figure 3:
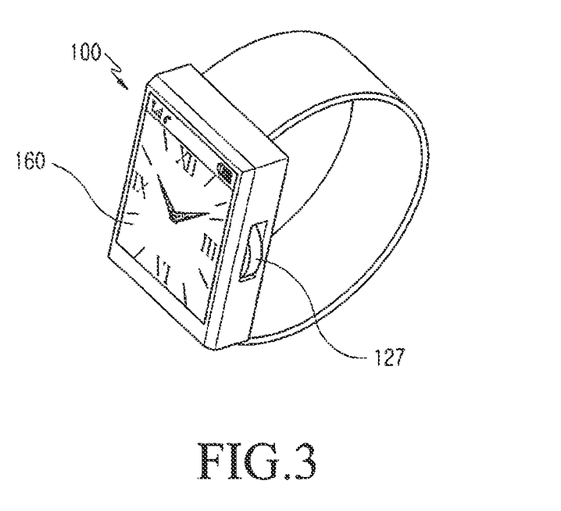
FIG. 3 illustrates a watch phone including a touch screen panel according to an embodiment of the present invention.
Figure 4A:
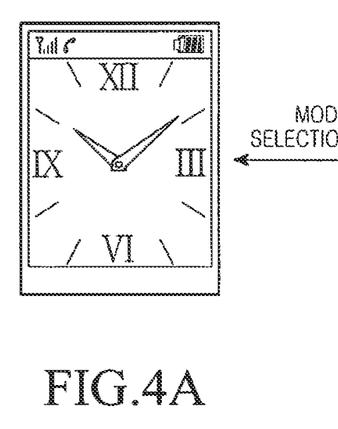
FIGS. 4A and 4B illustrate watch mode and idle mode displays in a watch phone including a touch screen panel according to an embodiment of the present invention.
Figure 4B:
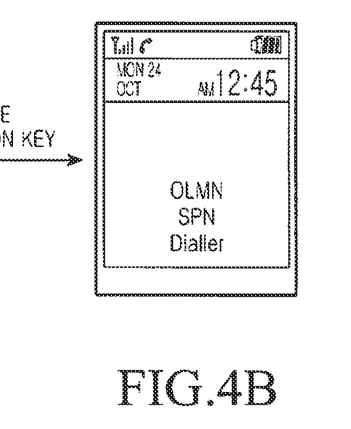
Figure 5A:
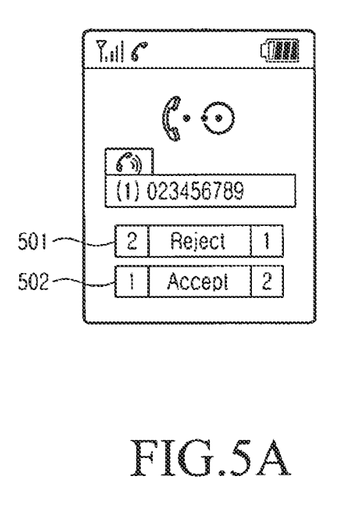
FIGS. 5A and 5B illustrate call connection and call rejection displays in a watch phone including a touch screen panel according to an embodiment of the present invention.
Figure 5B:
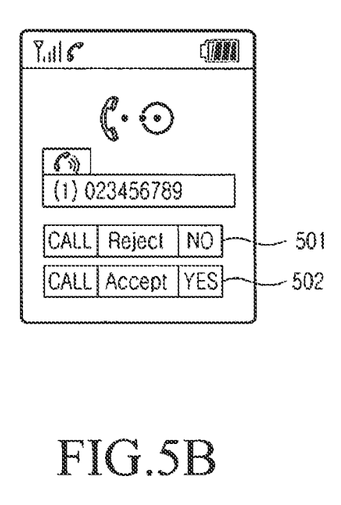

FIG. 2 is a block diagram of a watch phone including a touch screen panel according to an embodiment of the present invention, FIG. 3 illustrates a watch phone including a touch screen panel according to an embodiment of the present invention, FIGS. 4A and 4B illustrate watch mode and idle mode displays in a watch phone including a touch screen panel according to an embodiment of the present invention, and FIGS. 5A and 5B illustrate call connection and call rejection displays in a watch phone including a touch screen panel according to an embodiment of the present invention.

Referring to FIGS. 2 to 5B, a Radio Frequency (RF) module 123 performs a wireless communication function in the watch phone. The RF module 123 includes an RF transmitter for upconverting the frequency of a transmission signal and amplifying the upconverted transmission signal, and an RF receiver for low-noise-amplifying a received signal and downconverting the frequency of the low-noise-amplified signal.

A MODulator-DEModulator (MODEM) 120 includes a transmitter for encoding and modulating the transmission signal and a receiver for demodulating and decoding the received signal.

An audio processor 125 may form a COder-DECoder (CODEC). The CODEC commonly includes a data CODEC for processing packet data and an audio CODEC for processing an audio signal such as voice. The audio processor 125 converts a digital audio signal received from the MODEM 120 to an analog audio signal through the audio CODEC, thus reproducing the audio signal. Also, the audio processor 125 converts an analog audio signal received from a microphone to a digital audio signal through the audio CODEC and outputs the digital audio signal to the MODEM 120. The CODEC may be configured separately or incorporated into a controller 110.

A memory 130 may include a program memory and a data memory. The program memory may store programs for controlling typical operations of the watch phone and programs for controlling a call operation of the watch phone with a single key and a touch screen panel according to an embodiment of the present invention. The data memory temporarily stores data generated during executing the programs.

A display device 160 includes a touch screen panel 161 and a display 162.

The display 162 displays user data received from the controller 110. The display 162 may use a Liquid Crystal Display (LCD). Therefore, it may also include an LCD controller, a memory for storing image data, and an LCD device. The display 162 is kept on in a watch mode, in an idle mode, or upon reception of an incoming call according to an embodiment of the present invention.

Upon receipt of an incoming call in the watch phone, the display device 162 displays at least two areas 501 for call rejection and at least two areas 502 for call connection, as illustrated in FIGS. 5A and 5B.

The touch screen panel 161 acts as an input device. According to an embodiment of the present invention, if the touch screen panel 161 is placed in an off state in the watch mode, it transitions to an on state in the idle mode of the watch phone or upon receipt of an incoming call in the watch phone.

A mode selection key 127 is a single key provided on a side of the watch phone. The watch phone is switched to the watch mode as illustrated in FIG. 4A or to the idle mode as illustrated in FIG. 4B, according to the input of the mode selection key 127.

A watch function block 170 displays time on the display device 160 with the touch screen panel 161 kept off during the watch mode.

The controller 110 provides overall control to the watch phone. Alternatively, the controller 110 may include the MODEM 120 and the CODEC.

According to an embodiment of the present invention, when the watch phone is switched to the watch mode by the input of the mode selection key 127, the controller 110 turns off the touch screen panel 161 and turns on the display 162 in the watch mode. Upon receipt of an incoming call in the watch mode, the controller 110 turns on the touch screen panel 161 and keeps the display 162 on.

According to an embodiment of the present invention, when the watch phone is switched to the idle mode by the input of the mode selection key 127, the controller 110 turns on the touch screen panel 161 and the display 162 in the idle mode, and controls a function corresponding to a menu selected from the on-state touch screen panel 161 to be performed.

According an embodiment of the present invention, upon receipt of an incoming call in the watch mode or idle mode, the controller 110 alerts a user of the incoming call. If the at least two areas 502 for call connection are pointed to or a drag happens between the at least two areas 502 on the display device 160, the controller 110 controls the call to be connected.

According to an embodiment of the present invention, upon receipt of an incoming call in the watch mode or idle mode, the controller 110 alerts a user of the incoming call. If the at least two areas 501 for call rejection are pointed to or a drag happens between the at least two areas 501 on the display device 160, the controller 110 controls the call to be rejected.

Figure 6:
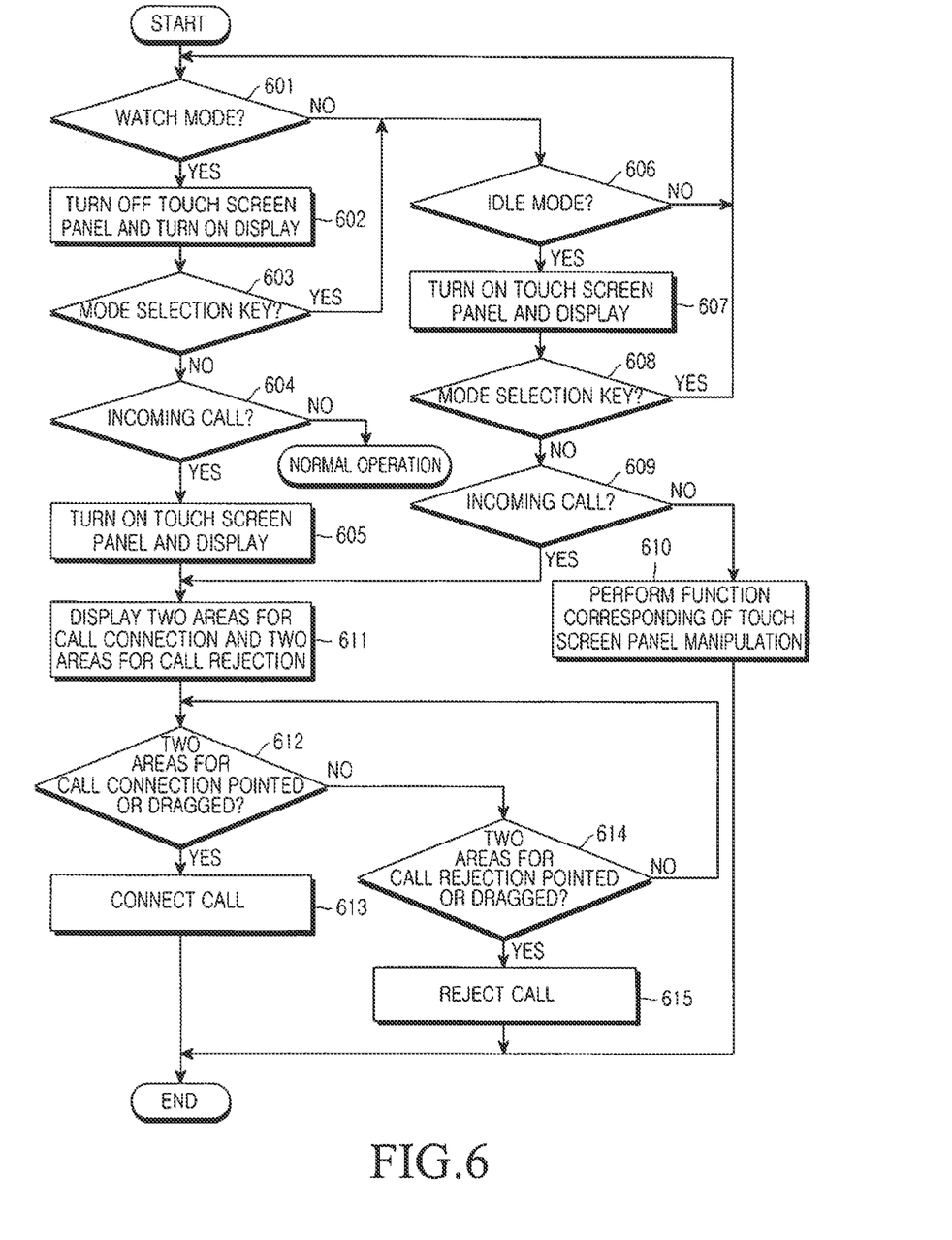
FIG. 6 is a flowchart illustrating a call operation in a watch phone including a touch screen panel according to an embodiment of the present invention.

FIG. 6 is a flowchart illustrating a call operation in a watch phone including a touch screen panel according to an embodiment of the present invention.

Referring to FIG. 6, when the watch phone is in the watch mode as illustrated in FIG. 4A, the controller 110 senses the watch mode in step 601 and thus turns off the touch screen panel 161 and turn on the display 162 in the display device 160 in step 602.

Upon selection of the mode selection key 127 in step 603, the controller 110 senses the input of the mode selection key 127 and switches the watch phone mode.

Upon receipt of an incoming call in step 604, the controller 110 senses the incoming call, turns on the touch screen panel 161, and keeps the display 162 on in step 605. After turning on the touch screen panel 161 in the display device 160 in step 605, the controller 110 displays the at least two areas 501 for call rejection and the at least two areas 502 for call connection on the display device 160, thus alerting the user of the incoming call in step 611.

After the mode selection key is input in step 603, or if the watch phone is in the idle mode in step 601, the controller 110 senses if the watch phone is in the idle mode in step 606 and turns on the touch screen panel 161 and the display 162 in the display device 160 in step 607, if in the idle mode.

Upon input of the mode selection key in step 608, the controller 110 senses the input of the mode selection key and switches the watch phone to the watch mode in step 601.

If the mode selection key is not input in step 608 and an incoming call is received in step 609, the controller 10 senses the incoming call. As illustrated in FIGS. 5A and 5B, the controller 110 controls the at least two areas 501 for call rejection and the at least two areas 502 for call connection to be displayed in the display device 160, thus alerting the user of the incoming call in step 611.

If the at least two areas 502 for call connection are pointed to or a drag happens between the at least two areas 502, the controller 110 senses the pointing or dragging in step 612 and connects the call in step 613. However, if the at least two areas 502 for call connection are pointed to or a drag happens between the at least two areas 502 in step 612 and the at least two areas 501 for call rejection are pointed to or a drag happens between the at least two areas 501, the controller 110 senses the pointing or dragging in step 614 and rejects the call in step 615.

More specifically, in FIGS. 5A and 5B, "1" and "2" are written in the two areas 502 for call connection in FIG. 5A. If "1" and "2" in the areas 502 are sequentially pointed to or a drag occurs from "1" to "2" during the call generation, the call is connected. Similarly, "2" and "1" are written in the two areas 501 for call rejection in FIG. 5A. If "1" and "2" in the areas 501 are sequentially pointed to or a drag occurs from "1" to "2" during the call generation, the call is rejected.

Referring to FIG. 5B, "Call" and "Yes" are written in the two areas 502 for call connection. If "Call" and "Yes" in the areas 502 are sequentially pointed to or a dragging occurs from "Call" to "Yes" during the call generation, the call is connected. Similarly, "Call" and "No" are written in the two areas 501 for call rejection. If "Call" and "No" in the areas 501 are sequentially pointed or a dragging occurs from "Call" to "No" during the call generation, the call is rejected.

If the mode selection key is not pressed in step 608 and an incoming call is not received in step 608, because the touch screen panel 161 is on in step 607, a menu may be selected by a user manipulation of the touch screen panel 161, and a function corresponding to the selected menu may be performed in step 610.

As described above, an inadvertent operation, such as an unintended input, is prevented by using two areas, which are pointed to or dragged between in order to reject or accept a call.

As is apparent from the description above, the above-described embodiments of the present invention provide a watch phone including a touch screen panel and a single key and a method for performing a call using the watch phone. Therefore, a call is easily performed despite a decrease in the number of external buttons, in case of a small-size terminal or a design-oriented terminal, such as a watch phone. Also, inadvertent operation of the touch screen panel is prevented.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A watch phone comprising:
a display device including a touch screen panel adapted to function as an input device and a display;
a mode selection key provided on an exterior side of the watch phone;
the mode selection key configured to receive key presses for alternately switching between a watch mode in which time is displayed and an idle mode; and
a controller configured to:
upon receipt of an incoming call, while displaying time on the display in the watch mode in which time is displayed, control the display to display a first area for call connection and a second area for call rejection, the second area being different from the first area, and control to receive touch input on the first area or the second area displayed on the display; and
while the watch phone has been switched to the idle mode in response to pressing of the mode selection key, control the display to display a menu, control performing a function corresponding to a menu item selected by a user manipulation of the touch screen panel in the idle mode, and upon receipt of an incoming call in the idle mode, control the display to display the first area and the second area.

2. The watch phone of claim 1, wherein if a touch input is detected on the first area for the call connection, the controller is configured to control a call to be connected, and
wherein if a touch input is detected on the second area for call rejection, the controller is configured to control the call to be rejected.

3. The watch phone of claim 1, wherein if a drag input is detected on the first area for call connection, the controller is configured to control a call to be connected, and
wherein if a drag input is detected on the second area for call rejection, the controller is configured to control the call to be rejected.

4. A method for handling a received call in a watch phone including a touch screen panel adapted to function as an input device and a display, the method comprising:
upon receipt of an incoming call, while displaying time on the display in a watch mode in which time is displayed, controlling the display to display a first area for call connection and a-second area for call rejection, and controlling to receive touch input on the first area or the second area displayed on the display; and
while the watch phone has been switched to an idle mode in response to pressing of a mode selection key which is included on an exterior side of the watch phone and configured to receive key presses for alternately switching between the watch mode in which time is displayed and the idle mode, controlling the display to display a menu, performing a function corresponding to a menu item selected by a user manipulation of the touch screen panel in the idle mode, and upon receipt of an incoming call in the idle mode, controlling the display to display the first area and the second area.

5. The method of claim 4, wherein the first area comprises two first areas, and
wherein connecting the incoming call occurs when the two first areas are sequentially pointed to or a drag input is detected in a predetermined direction between the two first areas.

6. The method of claim 4, wherein the second area comprises two second areas, and
rejecting the incoming call occurs when the two second areas are sequentially pointed to or a drag input is detected in a predetermined direction between the two second areas.

7. A non-transitory storage medium that stores instructions which, when executed by a controller of a watch phone, cause the watch phone to perform operations comprising:
upon receipt of an incoming call, while displaying time on a display in a watch mode in which touch input detection of a touch screen panel is turned off, controlling the display to display a first area for call connection and a second area for call rejection on the display, and controlling to turn on the touch input detection of the touch screen panel in order to receive touch input on the first area or the second area displayed on the display; and while the watch phone has been switched to an idle mode in response to an input signal of a single mode selection key included on an exterior side of the watch phone, controlling to turn on the touch input detection of the touch screen panel and performing a function corresponding to a menu selected by a user manipulation of the touch screen panel in the idle mode, and upon receipt of an incoming call, while displaying the menu on the display in the idle mode, controlling the display to display the first area and the second area.

\* \* \* \* \*